United States Patent
Gale et al.

[11] 3,924,925
[45] Dec. 9, 1975

[54] FOCUSSED IMAGE HOLOGRAM PROJECTOR USING A LONG NARROW LIGHT SOURCE

[75] Inventors: Michael Thomas Gale, Langnau am Albis; David Greenaway, Basserdorf, both of Switzerland

[73] Assignee: RCA Corporation, New York, N.Y.

[22] Filed: May 13, 1974

[21] Appl. No.: 469,219

[30] Foreign Application Priority Data
Jan. 30, 1974  United Kingdom................. 4226/74

[52] U.S. Cl. .......................... 350/3.5; 350/162 SF
[51] Int. Cl.² ...................... G03H 1/28; G03H 1/24
[58] Field of Search............ 350/3.5, 162 SF; 358/5, 358/6, 7, 44, 47

[56] References Cited
UNITED STATES PATENTS

| | | | |
|---|---|---|---|
| 755,983 | 3/1904 | Wood............................ | 350/162 SF |
| 3,535,013 | 10/1970 | Rosen............................ | 350/3.5 |
| 3,632,182 | 1/1972 | Sincerbox........................ | 350/3.5 |
| 3,633,989 | 1/1972 | Benton........................... | 350/3.5 |
| 3,743,507 | 7/1973 | Ih et al.......................... | 350/3.5 |
| 3,813,139 | 5/1974 | Carlsen.......................... | 350/3.5 |
| 3,834,786 | 9/1974 | Carlsen.......................... | 350/3.5 |

OTHER PUBLICATIONS
L. Mandel, Journal of the Optical Society of America, Vol. 55, No. 12, Dec. 1965, pp. 1697–1698.
Klimenko et al., Optics and Spectroscopy, Vol. 26, No. 6, June 1969, pp. 552–555.
Biedermann, Optica Acta, Vol. 17, No. 8, Aug. 1970, pp. 631–635.

Primary Examiner—Ronald J. Stern
Assistant Examiner—Jon W. Henry
Attorney, Agent, or Firm—Edward J. Norton; George J. Seligsohn; Irwin M. Krittman

[57] ABSTRACT

A filamentary light source and condenser system provide one or more light beams for illuminating a frequency-encoded focussed image hologram, the light diffracted therefrom being decoded by a slit-type spatial filter and projected onto a viewing screen to display a full color reconstruction.

8 Claims, 9 Drawing Figures

HOLOGRAM RECORDING
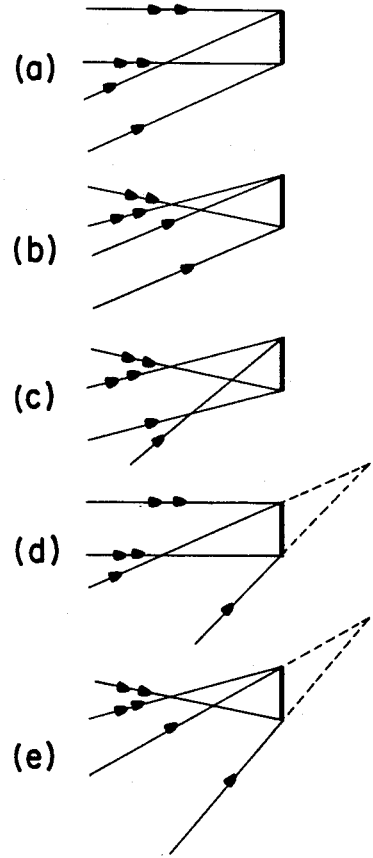
(a)
(b)
(c)
(d)
(e)
HOLOGRAM RECONSTRUCTION
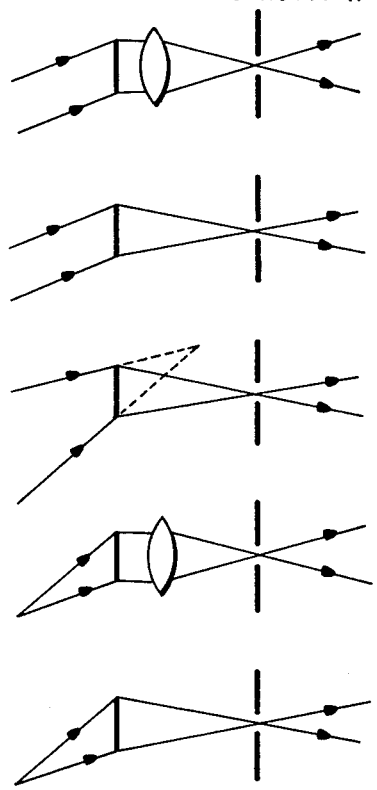
Fig. 9

FOCUSSED IMAGE HOLOGRAM PROJECTOR USING A LONG NARROW LIGHT SOURCE

BACKGROUND OF THE INVENTION

This invention relates to a novel projector for displaying color or black-and-white images and, particularly, to a projector for displaying reconstructions from frequency-encoded focussed image holograms.

Apparatus for projecting color or black-and-white images is well-known, especially in the micro-publishing field, where, typically, a filamentary light source, condenser optics, and a projection lens are employed to project images from conventionally-processed photographic microfilm onto a viewing screen. Often, a plurality of separate images are stored in a rectangular array on a single sheet of microfilm or card called a microfiche, and the images are displayed sequentially in a microfiche viewer. A major disadvantage of such a projector is the high cost of color, especially in relation to black-and-white, microfiche. Even when large quantities of color microfiche are processed, e.g., for catalog use, the cost per card can be prohibitive.

For many other applications, a desirable alternative to conventional photography is holographic image storage. See, for example, W. J. Hannan et al., "Holotape: A Low-Cost Prerecorded Television System Using Holographic Storage," Jour. SMPTE, Vol. 82, No. 11, pp. 905–915 (11/1973). A major advantage of holography is the low cost projected for high-volume replication, especially of relief-phase holograms. See, particularly, J. R. Frattarola, U.S. Pat. No. 3,758,649 (9/1973); and R. A. Bartolini et al., "Replication of Relief-Phase Holograms for Prerecorded Video," Jour. Electrochem. Soc., Vol. 120, No. 10, pp. 1408–1413 (10/1973).

Of the several known types of holograms, focussed image holograms are particularly suited to micropublishing. In focussed image holography, the images are stored as modulated diffraction gratings and reconstructed preferably by means of white light sources; lasers are not required for reconstruction. Various techniques have been developed for color encoding focussed image holograms. See, for example, K. Biedermann, "Image Encoding in Modulated Gratings from 1899 to 1970," Optica Acta, Vol. 17 No. 8, pp. 631–635 (8/1970). One such technique compatible with the goal of simple low cost projection apparatus is frequency-encoding, wherein parallel gratings of different carrier frequencies are modulated by the color image components. Heretofore, however, projection of frequency-encoded focussed image holograms has been achieved only with relatively complex and expensive apparatus comprising, for example, an array of line light sources for illuminating the holograms and a corresponding array of opaque bars for decoding the light diffracted by the holograms. See W. E. Glenn, "New Color Projection System," Jour. Optical Soc. of America, Vol. 48, No. 11 (11/1958).

SUMMARY OF THE INVENTION

The novel projector comprises first means for producing a non-coherent light beam incident on a focussed image hologram, the hologram comprising a plurality of modulated carriers of different spatial frequencies, and each carrier having been recorded by the interference of an effective reference beam of coherent light and an object beam thereof derived from a correspondingly different spectral component of the imaged object. Each such reference beam has a corresponding different angular relationship with the object beam, but a fixed wavefront geometry. The wavefront geometry of the incident light is the conjugate of the wavefront geometry of the reference beams, and each of the carriers diffracts a correspondingly different spectral portion of the incident light in a given direction. The projector also comprises second means for directing the diffracted portions only of the incident light onto a viewing screen, to display a reconstruction of the object.

Preferably, each of the carriers corresponds to a different one of the three primary colors of the object, so that a full reconstruction thereof is projected onto the screen. Also preferbly, the carriers are plane parallel diffraction gratings and the incident light is a one-dimensionally collimated beam at a predetermined angle with respect to the hologram normal, such that each of the carriers diffracts a correspondingly different spectral portion of the incident light in a first-order diffraction direction normal to the hologram. The first and second means, respectively, may comprise a filamentary light source and logitudinal slit, each extending parallel to the direction of the diffraction grating lines. Moreover, the first means may further produce a non-coherent one-dimensionally collimated light beam incident on the hologram at an angle equal in magnitude to the predetermined angle but opposite thereto with respect to the hologram normal, to increase the collection efficiency of the non-coherent light source.

BRIEF DESCRIPTION OF THE DRAWINGS

FIG. 9 is an illustration of several examples of alternative hologram recording geometries and corresponding projector illumination geometries.

DESCRIPTION OF THE PREFERRED EMBODIMENTS

Figure 1:
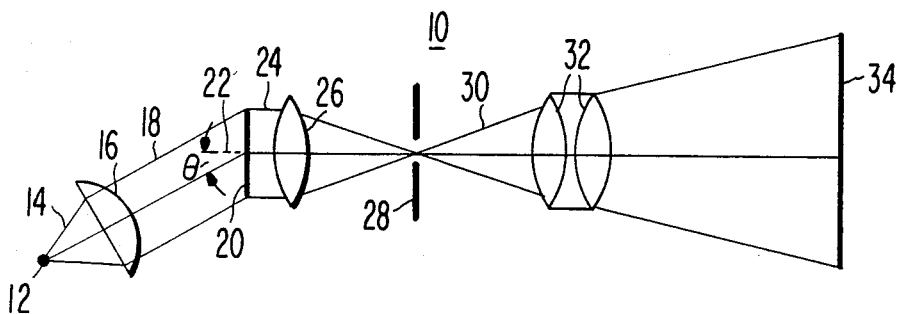
FIG. 1 is a schematiic illustration of an embodiment of the novel projector employing single-beam illumination of a frequency-encoded focussed image hologram.
Figure 2:
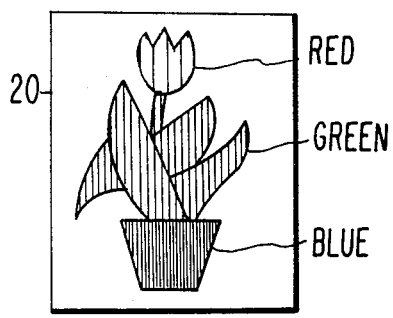
FIG. 2 is a simple example of the hologram of FIG. 1.

A simple embodiment of the novel projector is shown in FIG. 1, wherein the projector 10 comprises a source of white light 12, the light 14 from which is collimated, in the plane or dimension shown, by a condenser lens 16. The collimated light 18 emerging from the lens 16 is, in turn, incident on a transmissive-type frequency-encoded focussed image holograms 20 at an angle $\theta$ with respect to the hologram normal 22. The focussed image hologram 20 typically comprises three superimposed plane parallel diffraction gratings, each modulated by a different color component of the original image and each having a different spatial frequency related to one of the color components. A simple example of the focussed image halogram 20 is shown in FIG. 2 [adapted from the single figure of the abovecited article appearing in Optica Acta, Vol. 17, No. 8, pp. 631–635], wherein the spatial frequencies of the gratings corresponding to the primary color: blue (mean wavelength $\lambda_b = 4600$ A), green (mean wavelength $\lambda_g = 5300$ A) and red (mean wavelength $\lambda_r = 6500$ A), are designated $S_b$, and $S_r$, respectively. The spatial frequencies $S_b$, $S_g$ and $S_r$ are calculated from the equation:

$$S \times \lambda = \sin \theta, \qquad (1)$$

so that each grating of the focussed image hologram 20 diffracts its corresponding primary color in a first-order direction centered about the hologram normal 22. Thus for a typical value of $\theta$, 20°, $S_b$, $S_g$, and $S_r$ are 744, 645 and 526 lines per millimeter, respectively.

The first order diffracted light 24 emerging normal to the focussed image hologram 20 is then focussed by means of an imaging lens 26, to form three color spectra on the plane of a spatial filter 28 located a focal length away from the lens 26. The spatial filter 28 transmits the required portions of the incident color spectra diffracted by the three gratings of the focussed image halogram 20 and blocks the remaining portions thereof. The transmitted light 30, in turn, is projected by means of a projection lens 32 onto a suitable viewing screen 34, whereby a full color reconstruction of the image recorded by the focussed image hologram 20 may be viewed, preferably in transmission. A typical viewing screen 34 may comprise a known fresnel lens-diffuser combination.

Because of the parallel relationship among the three gratings of the focussed image hologram 20, the elements of the projector 10 which affect the colorimetry thereof are constrained in only one plane. Thus the light source 12 can be a quartz-halogen lamp simply comprising a long narrow filament extending parallel to the direction of the grating lines (and perpendicular to the plane of the section shown in FIG. 1). While the width or diameter of such a filamentary light source 12 is limited by the acceptable wavelength spread of the primary colors, the length thereof is limited mainly by the ability of the condenser lens 16 to collect the light 14 and direct it onto the focussed image hologram 20. Typically, the light source 12 has a filament about one millimeter in diameter and about 20 millimeters long and is rated at about 200 watts. The spatial filter 28 can then simply be an on-axis slit extending parallel to the filament of the light source 12, the slit also typically having a diameter of about 1 millimeter and a length of about 20 millimeters.

Figure 3:
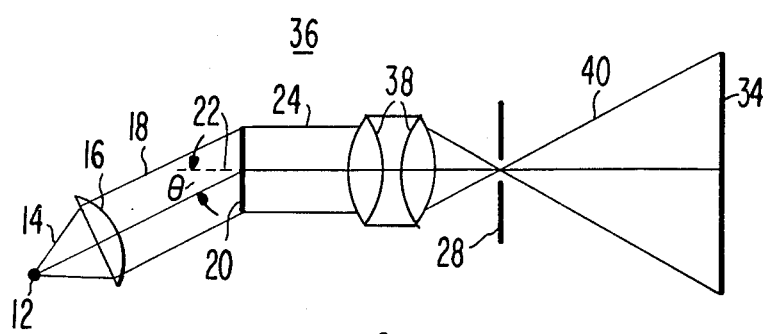
FIG. 3 is a schematic illustration of a variation of the embodiment of FIG. 1.

A variation of the simple projector 10 of FIG. 1 is shown in FIG. 3, wherein the projector 36 comprises a similar, also preferably filementary, light source 12, the light 14 from which is colimated by a similar condenser lens 16. The collimated light 18 emerging from the lens 16 is, in turn, incident on a similar frequency-encoded focussed image hologram 20 at the same angle $\theta$ with respect to the hologram normal 22. The first-order diffracted light 24 emerging normal to the focussed image hologram 20 is then collected by a projection lens 38, which itself focusses the light 24 to form three color spectra on the plane of a similar, also preferably on-axis slit-type, spatial filter 28. Lens 38 also projects the light 40 transmitted by the spatial filter 28 onto a similar viewing screen 34. In addition to elimination the imaging lens 26 of the projector 10 shown in FIG. 1, the arrangement of FIG. 3 allows the projection lens 38 to be closer to the focussed image hologram 20, thereby relaxing the lens aperture requirement therefor.

The projectors 10 and 36 shown in FIGS. 1 and 3, respectively, are readily modified to display black-and-white reconstructions from either frequency-encoded or single-frequency focussed image holograms, by simple removal of the spatial filter or slit 28. Conventional color or black-and-white photographic transparencies can also be projected onto the screen 34, after insertion of a prism or other optical component (not shown), after the condenser lens 16, such that a given transparency (replacing the focussed image hologram 20) is illuminated by collimated light 18 at normal incidence.

Figure 4:
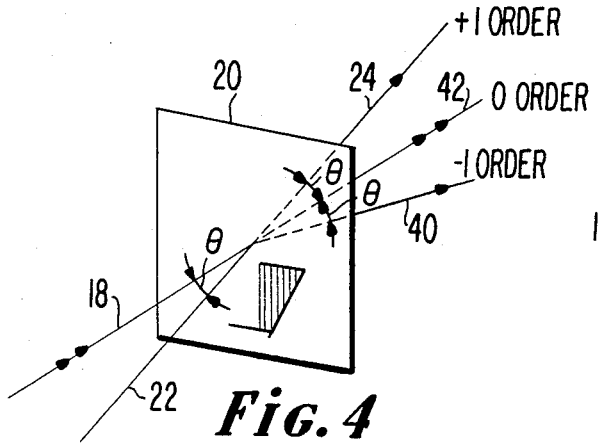
FIG. 4 is an illustration of the single-beam illumination geometry of FIGS. 1 and 3.

Still further embodiments of the novel projector result from the realization that the first-order diffracted light 24 emerging normal to the focussed image hologram 20 in the projectors of FIGS. 1 and 3 is but one of a pair of first-order diffractions, as shown in FIG. 4. The other first-order diffracted 40 emerges at an opposite but equal angle $\theta$ with respect to the non-diffracted or zero order light 42 emerging from the focussed image hologram 20. Hence, the collimated light 18 emerging from the condenser lens 16 can be incident on the focussed image hologram 20 at either of two equal and opposite angles $\theta$ with respect to the hologram normal 22 to produce a first-order diffraction normal to the hologram.

Figure 5:
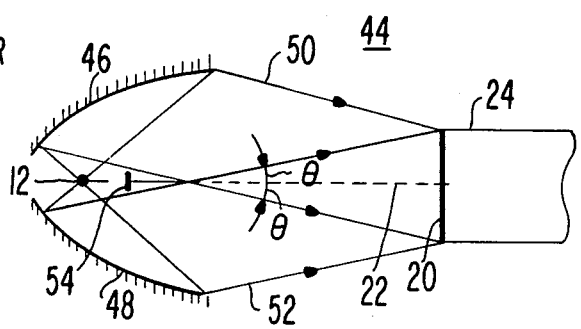
FIG. 5 is a schematic illustration of a portion of an embodiment of the novel projector employing two-beam illumination of the frequency-encoded focussed image hologram of FIG. 2.

FIG. 5 illustrates a portion of a projector 44 wherein a preferably filamentary light source 12 similar to that of FIGS. 1 and 3 is positioned at the common focus of two collimating mirrors 46 and 48, which correspond typically to the complementary halves of a single paraboloid in the plane or direction shown. The mirrors 46 and 48, which can be readily formed by inexpensive known metal processing techniques, are angled such that a frequency-encoded focussed image hologram 20, similar to that of FIGS. 1 and 3, is illuminated by each of two collimated plane waves 50 and 52 at equal and opposite angles $\theta$ with respect to the hologram normal 22. A stop 54 prevents light emitted in the forward direction by light source 12 from also reaching the focussed image hologram 20. The stop 54, similarly to the light source 12, extends parallel to the direction of the grating lines of the hologram 20. The two coincident first-order diffractions resulting from the collimated waves 50 and 52 sum to become the diffracted light 24 emerging normal to the focussed image halogram 20. Thereafter, the projector 44 may correspond to that of FIG. 1 or FIG. 3. The mirrors 46 and 48 enable a large effective condenser aperture to be realized by the projector 44, resulting in the more efficient collection of light from the light source 12.

Figure 6:
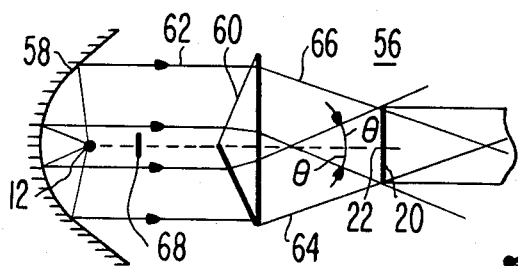
FIG. 6 is a schematic illustration of a portion of another embodiment employing two-beam illumination.

Two-beam illumination can also be effected as shown in FIG. 6, which illustrates a portion of a projector 56, wherein light from a preferably filamentary light source 12 is collimated by a parabolic mirror 58 and then intercepted by a prism 60. The prism 60 then splits the collimated light 62 into two waves 64 and 66, which, in turn, are incident on a focussed image hologram 20 at equal and opposite angles $\theta$ with respect to the hologram normal 22. A stop 68 prevents light emitted in the forward direction by light source 12 from reaching the prism 60. Following the focussed image hologram 20, the projector 56 too may correspond to that of FIG. 1 or FIG. 3. The arrangement of FIG. 6 also results in an efficient and compact condenser system.

Figure 7:
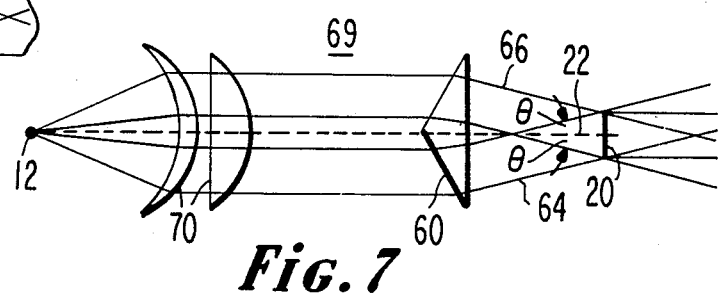
FIG. 7 is a schematic illustration of a variation of the embodiment of FIG. 6.

A variation 69 of the portion of projector 56 of FIG. 6 is shown in FIG. 7, wherein light from a similar light source 12 is collimated by a combination of condenser lens elements 70 before intercepted by a similar wavesplitting prism 60. This arrangement eliminates a need for collimating mirrors as shown in FIGS. 5 and 6.

GENERAL CONSIDERATIONS

Figure 8:
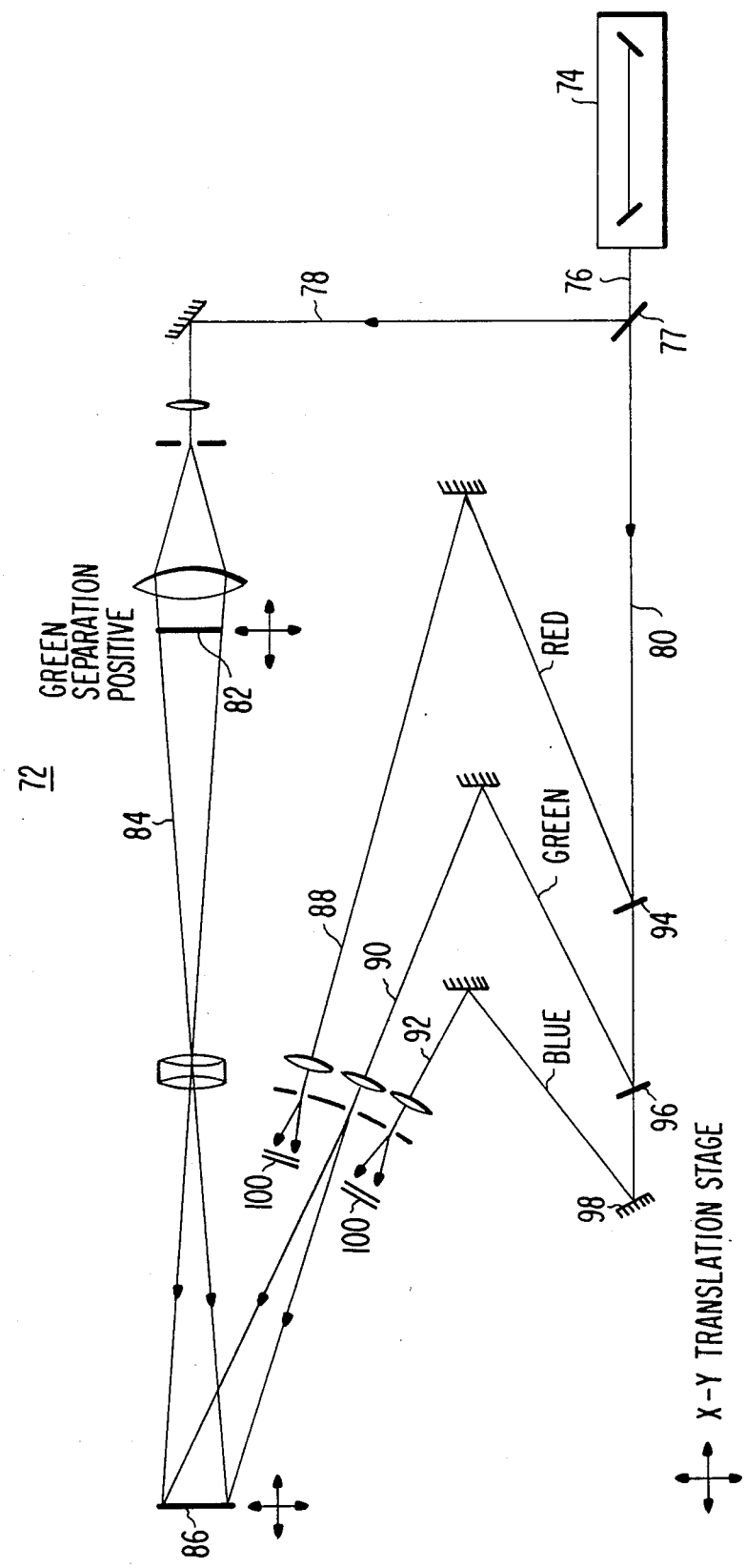
FIG. 8 is a schematic illustration of a system for recording the hologram of FIG. 1.

It should be understood that the invention is not limited to the embodiments described above. For example, the focussed image hologram 20 shown in FIG. 2 may be one of a plurality of such holograms stored on a suitable card and displayed sequentially in any of the projectors shown in FIGS. 1, 3, 5, 6, and 7. Various methods for effecting x-y movement of such a card are known, particularly in the micropublishing field. Typically, 40 frequency-encoded focussed image holograms, each about 10 mm × 14 mm, are produced in a 10 × 4 array as follows:

Each original object is reduced to a given size color transparency, which is then imaged onto a photographic plate through appropriate color filters to produce three color separation positives. Holographic recording is then effected by means of a system 72, shown in FIG. 8, which comprises a conventional helium-cadmium laser 74 for producing a beam of coherent light 76. The beam 76 is incident on a partially reflecting mirror 77, which splits the beam 76 into a reflected first portion 78 and a transmitted second portion 80. The first portion 78 is then transmitted by appropriate optics, through one of the color separation positives, e.g., the green separation positive 82. The light 84 modulated by the color separation positive 82 is, in turn, imaged onto a photoresist plate 86. The second portion 80 of the coherent light beam 76 is itself split into three reference beams 88, 90, and 92, by means of partially reflecting mirrors 94 and 96 and reflecting mirror 98. The mirrors 94, 96, and 98 are positioned such that each of the reference beams 88, 90 and 92, corresponding to the red, green and blue separation positives, respectively, is set at a different predetermined angle with respect to the modulated light or information beam 84. The appropriate reference beam, e.g., the green reference beam 90, is then imaged onto the photoresist plate 86, while the other reference beams 88 and 92 are blocked therefrom by shutters 100. The information beam 84 and reference beam 90 then interfere to record a relief-phase focussed image hologram on the photoresist plate 86. By successive exposures, using the other color separation positives and their respective reference beams, three such focussed image holograms are recorded in superposition on the plate 86, each hologram corresponding to a different one of the separation positives and having a carrier frequency determined by the respective reference beam angle. Thereafter, the photoresist of plate 86 is developed, and the superimposed holograms therein are replicated by known techniques comprising, for example, the making of a metal master and embossing into transparent plastic. See the above-cited U.S. Pat. No. 3,758,649 and article appearing in Jour. Electrochem. Soc., Vol. 120, No. 11, pp. 1408–1413.

Other, including synthetic, methods and systems for producing the frequency-encoded focussed image holograms described above may be employed. In addition, the holograms need not comprise plane diffraction gratings. That is, for each color component of the original image, the corresponding focussed image hologram may be recorded by the interference of two coherent wavefronts which are other than plane parallel light beams. The general requirements of the novel projector are that the wavefront geometry of the light wave incident on the frequency-encoded focussed image hologram (e.g., the light wave 18 in FIGS. 1 and 3 and each of the waves 50 and 52 in FIG. 5 and 64 and 66 in FIGS. 6 and 7) be the conjugate of the wavefront geometry of the reference beam used in recording the hologram (e.g., beams 88, 90, and 92 in FIG. 8) and incident (e.g., at the angle $\theta$ in FIGS. 1, 3, 5, 6, and 7) such that each modulated carrier diffracts the light wave so as to reconstruct a pure spectrum at the plane of the spatial filter. FIG. 9 illustrates five examples a, b, c, d, and e of possible hologram recording geometries (on the left) and corresponding reconstruction or projector geometries (on the right). In each example the wave normal to the hologram recording plane is the information beam; also, the projector optics are not shown.

Finally, it should be recognized that other combinations (not shown) of various known optical components may be employed in the novel projector to display color or black-and-white images.

What is claimed is:

1. In a projector for displaying a color picture derived from a focussed image hologram situated in a given plane, said hologram being of the type comprising a plurality of plane parallel diffraction gratings each of said gratings having grating lines of a different constant spatial frequency being modulated in accordance with a different color component of said color picture to form a spatial carrier for that color component; said projector including first means for illuminating said hologram with an incident non-coherent light beam inclined at a predetermined angle with respect to the normal to said given plane, said non-coherent light beam having a spectrum which includes a spectral wavelength portion corresponding to each respective one of said different color components, and second means responsive only to first diffraction-order output light from said respective gratings for projecting said color picture on a viewing screen; the improvement therein:

a. wherein the lines of at least one of said gratings in said given plane is oriented substantially parallel to a given longitudinal axis none of said gratings in said given plane is oriented substantially perpendicular to said longitudinal axis, b. wherein said first means includes a filamentary light source having a relatively long length dimension oriented substantially parallel to said longitudinal axis and relatively small cross-section dimensions oriented substantially normal to said longitudinal axis, and optical means responsive to light from said light source for deriving said non-coherent light beam with said predetermined angle lying in a plane substantially normal to said longitudinal axis, c. wherein said second means includes a spatial filter having a narrow, longitudinal slit therein with the length of said slit being oriented along said longitudinal axis, and d. wherein said different predetermined spatial frequencies of each of said respective gratings is such as to direct through said slit only the spectral wavelength portion of first diffraction-order output light from that grating which corresponds to the color component of said picture carried by that grating.

2. The projector defined in claim 1, wherein at least two of said gratings in said given plane are oriented substantially parallel to said given longitudinal axis.

3. The projector defined in claim 2, wherein said plurality of gratings is three, and all three of said gratings in said given plane are oriented substantially parallel to said given longitudinal axis.

4. The projector defined in claim 1, wherein said second means further includes a projection lens for imaging only the output light direction through said slit on said viewing screen.

5. The projector defined in claim 1, wherein said optical means of said first means includes means for collecting light from said source and deriving therefrom respective first and second non-coherent light beams each of which is incident on said hologram at an angle of inclination with respect to said normal to said given plane which lies in a plane substantially normal to said longitudinal axis and is equal in size to said predetermined angle, said respective first and second non-coherent light beams being symmetrically disposed on either side of said normal to said given plane of said hologram.

6. The projector defined in claim 5, wherein said means for collecting light includes first and second reflectors each partially surrounding said light source, said first reflector being disposed on one side of a medial plane defined by the normal to said given plane and said longitudinal axis and having a curvature for forming light from said source reflected therefrom into said first non-coherent light beam, said second reflector being symmetrically disposed on the other side of said medial plane and having a curvature for forming light from said source reflected therefrom into said seocnd non-coherent light beam, and a stop situated between said source and said hologram to prevent light from said source to directly illuminate said hologram without first being reflected from one of said reflectors.

7. The projector defined in claim 5, wherein said means for collecting light includes a parabolic reflector partially surrounding said source for deriving a parallel beam of light oriented normal to said given plane and directed toward said hologram, a prism situated between said source and said hologram in the path of said parallel beam of light for converting the light thereof into said first and second noncoherent light beams, and a stop situated between said source and said prism for preventing light from said source to directly illuminate said prism without reflection from said parabolic reflector.

8. The projector defined in claim 5, wherein said means for collecting light includes lens means situated between said source and said hologram for deriving a parallel beam of light oriented normal to said hologram, and a prism situated between said lens means and said hologram in the path of said parallel beam of light for converting the light thereof into said first and second non-coherent light beams.

\* \* \* \* \*